United States Patent
Balamane et al.

(10) Patent No.: US 7,554,764 B2
(45) Date of Patent: Jun. 30, 2009

(54) LIFT-OFF METHOD FOR FORMING WRITE POLE OF A MAGNETIC WRITE HEAD AND WRITE POLE FORMED THEREBY

(75) Inventors: Hamid Balamane, Palo Alto, CA (US); Jyh-Shuey Lo, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 377 days.

(21) Appl. No.: 11/399,820

(22) Filed: Apr. 7, 2006

(65) Prior Publication Data

US 2007/0236832 A1 Oct. 11, 2007

(51) Int. Cl.
*G11B 5/147* (2006.01)

(52) U.S. Cl. .................. 360/125.03; 26/603.13

(58) Field of Classification Search ............ 360/126, 360/125.15, 125.47, 125.48, 125.52, 125.53, 360/125.6, 125.61, 125.65, 125.66, 125.03; 29/603.14, 603.13
See application file for complete search history.

(56) References Cited

U.S. PATENT DOCUMENTS

| 5,079,662 | A | | 1/1992 | Kawakami et al. |
| 5,867,890 | A | * | 2/1999 | Hsiao et al. ............... 29/603.14 |
| 5,959,813 | A | * | 9/1999 | Watanabe et al. ....... 360/125.65 |
| 6,178,065 | B1 | | 1/2001 | Terunuma et al. |
| 6,685,846 | B2 | * | 2/2004 | Lee et al. ...................... 216/27 |
| 6,788,496 | B2 | * | 9/2004 | Tolman et al. ......... 360/125.53 |
| 2004/0020029 | A1 | | 2/2004 | Kakehi |
| 2004/0228030 | A1 | | 11/2004 | Mochizuki et al. |
| 2005/0041337 | A1 | | 2/2005 | Yazawa et al. |
| 2005/0057852 | A1 | | 3/2005 | Yazawa et al. |
| 2005/0066517 | A1 | | 3/2005 | Bedell et al. |
| 2005/0068665 | A1 | | 3/2005 | Le et al. |
| 2005/0068672 | A1 | | 3/2005 | Lee et al. |
| 2007/0115584 | A1 | * | 5/2007 | Balamane et al. ........... 360/126 |

FOREIGN PATENT DOCUMENTS

| JP | 62008320 | 1/1987 |
| JP | 62099908 | 5/1987 |
| JP | 4010208 | 1/1992 |

(Continued)

OTHER PUBLICATIONS

Charlie Fields, et al.; Metal Lift-off on InP HBTs Using Carbon Dioxide Snow Spray; Eco Snow Systems, Livermore CA 94550; HRL Laboratories, Malibu, CA 90265.

(Continued)

*Primary Examiner*—Angel A. Castro
(74) *Attorney, Agent, or Firm*—Merchant & Gould

(57) ABSTRACT

A lift-off method for forming write pole of a magnetic write head and write pole formed thereby is disclosed. A write pole including a hard mask on a top portion of the write pole is formed. A layer of material for reinforcing sidewall fencing of the write pole is deposited. Portions of the layer of material on top of the write pole are removed while the layer of material at the sidewall fencing is left to provide support to the sidewall fencing.

5 Claims, 12 Drawing Sheets

FOREIGN PATENT DOCUMENTS

| | | |
|---|---|---|
| JP | 4268205 | 9/1992 |
| JP | 5159223 | 6/1993 |
| JP | 5342534 | 12/1993 |
| JP | 618056 | 3/1994 |
| JP | 6274822 | 9/1994 |
| JP | 10275312 | 10/1998 |
| JP | 2000339622 | 12/2000 |

OTHER PUBLICATIONS

Werner V. Brandt, Cleaning of Photomask Substrates Using CO2 Snow; Eco-Snow Systems, Inc., Livermore, CA.

Andy Hakanson, et al.; Seagate Technology; Borden, et al, Eco-Snow Systems; Removing post-CMP Residue Through Carbon Dioxide Snow Cleaning; micromagazine.com.

* cited by examiner

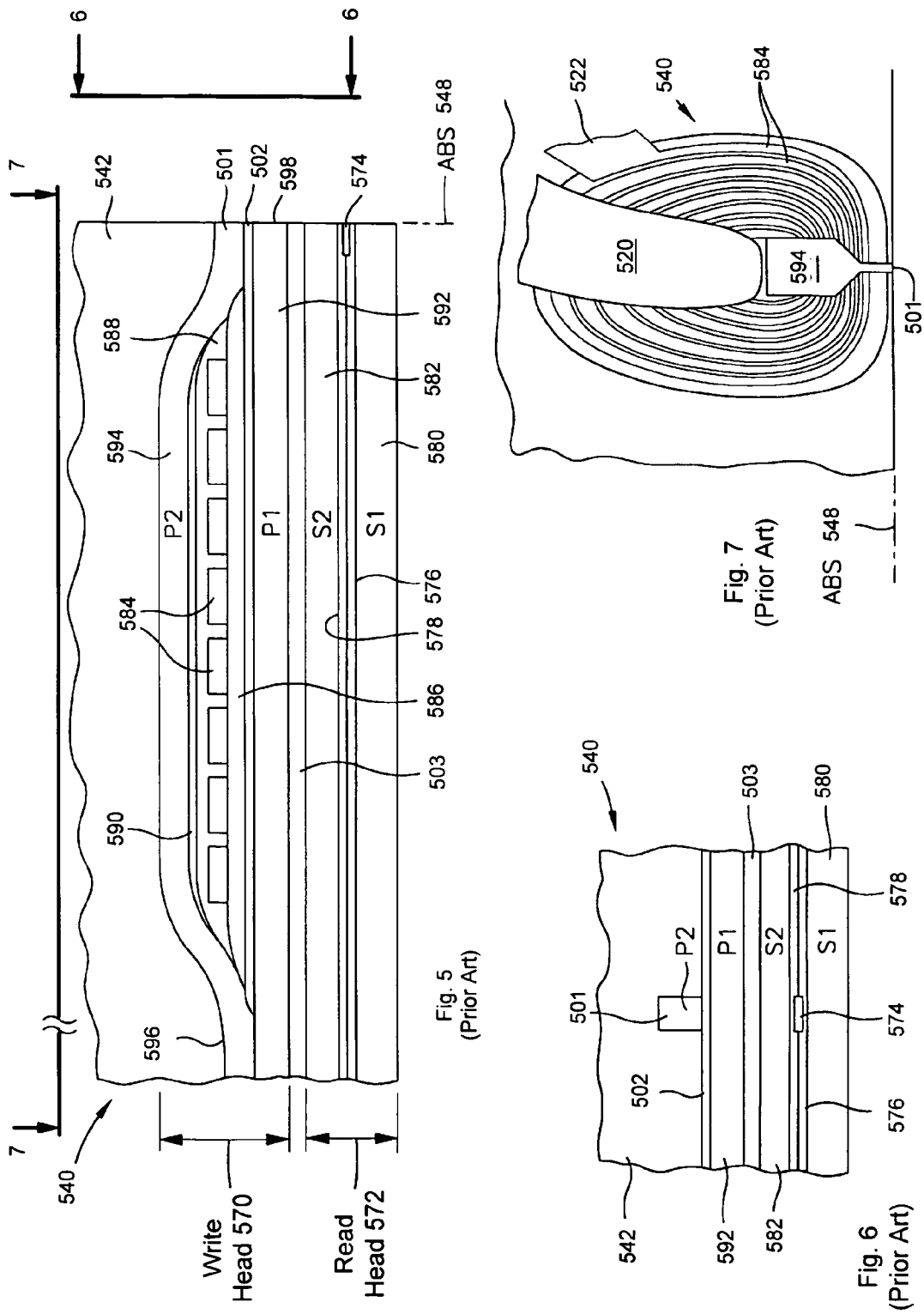

LIFT-OFF METHOD FOR FORMING WRITE POLE OF A MAGNETIC WRITE HEAD AND WRITE POLE FORMED THEREBY

FIELD OF THE INVENTION

This disclosure relates in general to magnetic write heads, and more particularly to a lift-off method for forming write pole of a magnetic write head and write pole formed thereby.

BACKGROUND

A hard disk drive includes a thin-film magnetic recording read/write head (TFH), a rotating disk with thin-film magnetic media, a spindle motor to drive the disk, an electromagnetic voice-coil rotary actuator with a gimbal suspension to move the slider across the disk surface, and electronics. The TFH consists of an inductive electromagnetic coil writer, a giant magnetoresistive (GMR) reader, and a slider body with an air-bearing surface, which flies over the magnetic disk to perform the read and write functions.

The TFH transducers are produced using a thin-film wafer-processing technology. TFH wafer processing is similar to that used in the fabrication of semiconductor devices, involving deposition, photolithography, etch, electroplating, and CMP.

In the inductive writer, the electromagnetic coil induces magnetic flux in the loops, and the magnetic field between two pole tips (write gap) writes information on a disk. The write gap determines the linear bit density. In the GMR reader, the magnetic field from the disk changes the resistance of the GMR sensor and indicates the transition information. The sensor gets the data back by seeing the vertical magnetic-field transition from the disk. The bottom shield S1 and the top shield S2 prevent the GMR sensor from responding to fields just before and immediately after the transition to improve the linear bit resolution. The distance between two shields is referred to as the read gap, which determines the linear density of reading. The GMR sensor effect is due to scattering between two magnetic layers—a free layer and a pinned layer. The free layer is a soft magnet and magnetization is free to rotate. The pinned layer is fixed by exchange coupling to an antiferromagnet and magnetization, which keeps it stationary. The resistance of the GMR head changes, depending upon the angle between the magnetization of two layers, due to the effect of magnetic field from the disk on the free layer. The antiferromagnetic exchange layer provides the pinning field to the pinned layer.

Magnetic read/write head design and fabrication technology are following the same trends as semiconductors. For the last several years, annual performance enhancement of read/write heads for magnetic data storage (areal density gigabits/in.2=linear density bits/in.xtrack density tracks/in.) has doubled each year. With shrinking device dimensions and new magnetic materials, critical dimensions in the read/write heads have actually become smaller than those in semiconductors.

One common approach of defining perpendicular head pole structure is to ion mill laminated magnetic film through some type of hard mask, which is usually formed by milling-resistant organic or inorganic material. Due to the nature of ion milling, fencing is formed on the sidewall of remaining hard mask. Conventional stripping processes like wet stripping or snow cleaning all have their disadvantages in removing the remaining hard mask, e.g., wet stripping has difficulty to completely remove the fencing and snow clean could easily bend the pole.

The top critical dimension (CD) of the pole for perpendicular head is the most critical head parameter. Any deterioration to the CD cannot be accepted. In fact, the fencing on the remaining hard mask sidewall is very thin, which is allowed to be left in head without degrading the pole's magnetic property. However, if the remaining hard mask is simply removed by wet stripping or dry stripping, the unsupported fence can easily collapse during stripping process or subsequent refill process and result in Alumina fill defect, which will result in reliability issue.

It can be seen that there is a need for a lift-off method for forming write pole of a magnetic write head and write pole formed thereby.

SUMMARY OF THE INVENTION

To overcome the limitations in the prior art described above, and to overcome other limitations that will become apparent upon reading and understanding the present specification, the present invention discloses a lift-off method for forming write pole of a magnetic write head and write pole formed thereby.

The present invention solves the above-described problems by providing a protective layer formed along an outside surface of fencing to provide support to the fencing.

A method for forming write pole of a magnetic write head in accordance with the principles of the present invention includes forming a write pole including depositing a hard mask on a top portion of the write pole, depositing a layer of material for reinforcing sidewall fencing of the write pole formed around the hard mask and removing portions of the layer of material on top of the write pole while leaving the layer of material at the sidewall fencing to support the sidewall fencing.

In another embodiment of the present invention, a write head is disclosed. The write head includes a write pole that includes fencing at a top portion of the write pole, the fencing and a sidewall of the write pole having a layer of material formed on an outer surface to support the sidewall fencing.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 5 is a side cross-sectional elevation view of a magnetic head;

FIG. 6 is an air bearing surface (ABS) view of the magnetic head of FIG. 5;

FIG. 7 illustrates the connect leads coupled to the coil for the write pole piece;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a lift-off method for forming write pole of a magnetic write head and write pole formed thereby. A protective layer is formed along an outside surface of fencing to provide support to the fencing.

Figure 1:
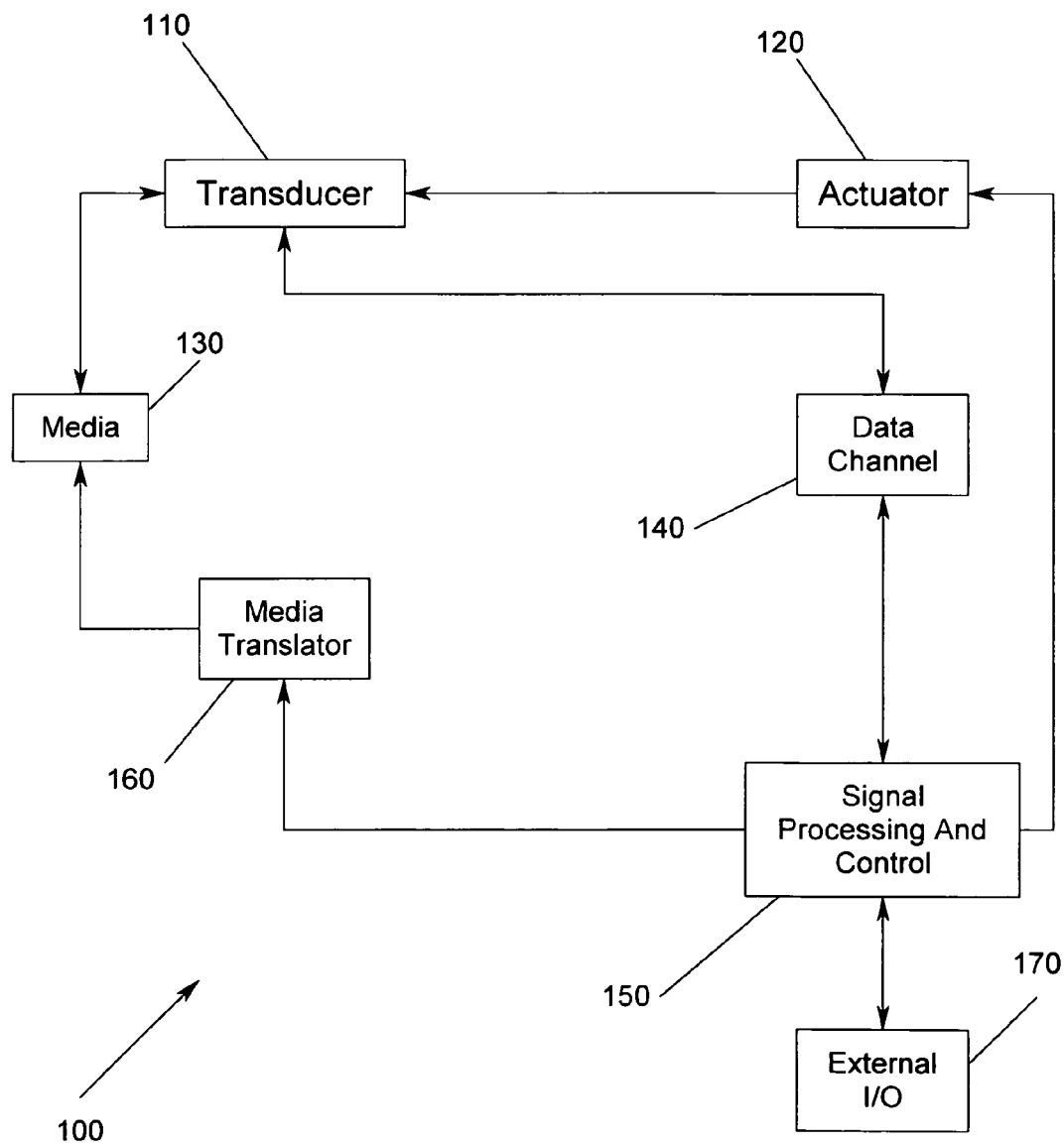
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
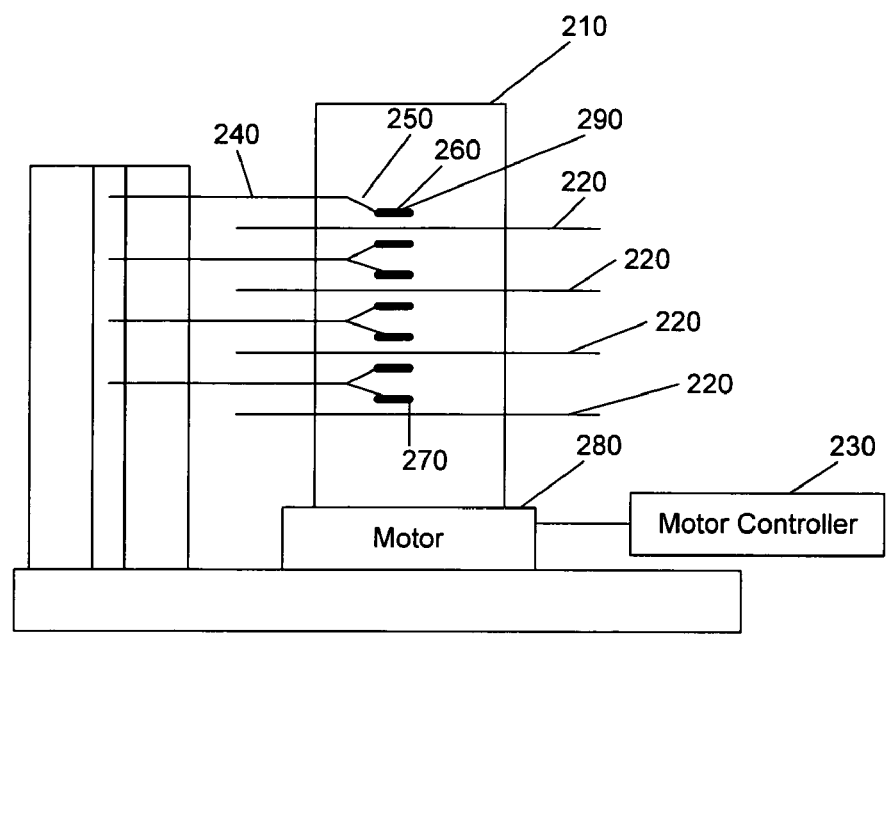
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
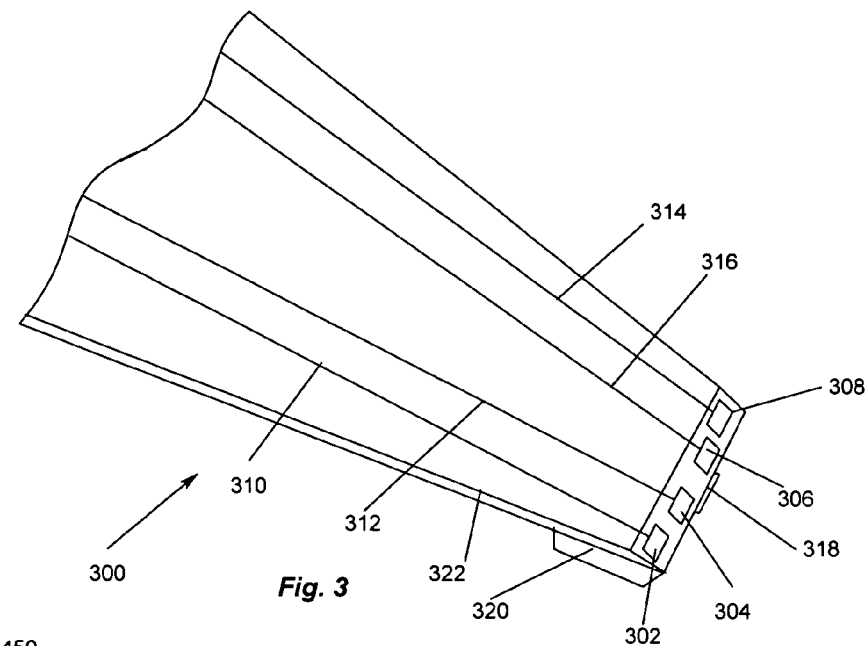
FIG. 3 illustrates a slider mounted on a suspension according to an embodiment of the present invention.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

Figure 4:
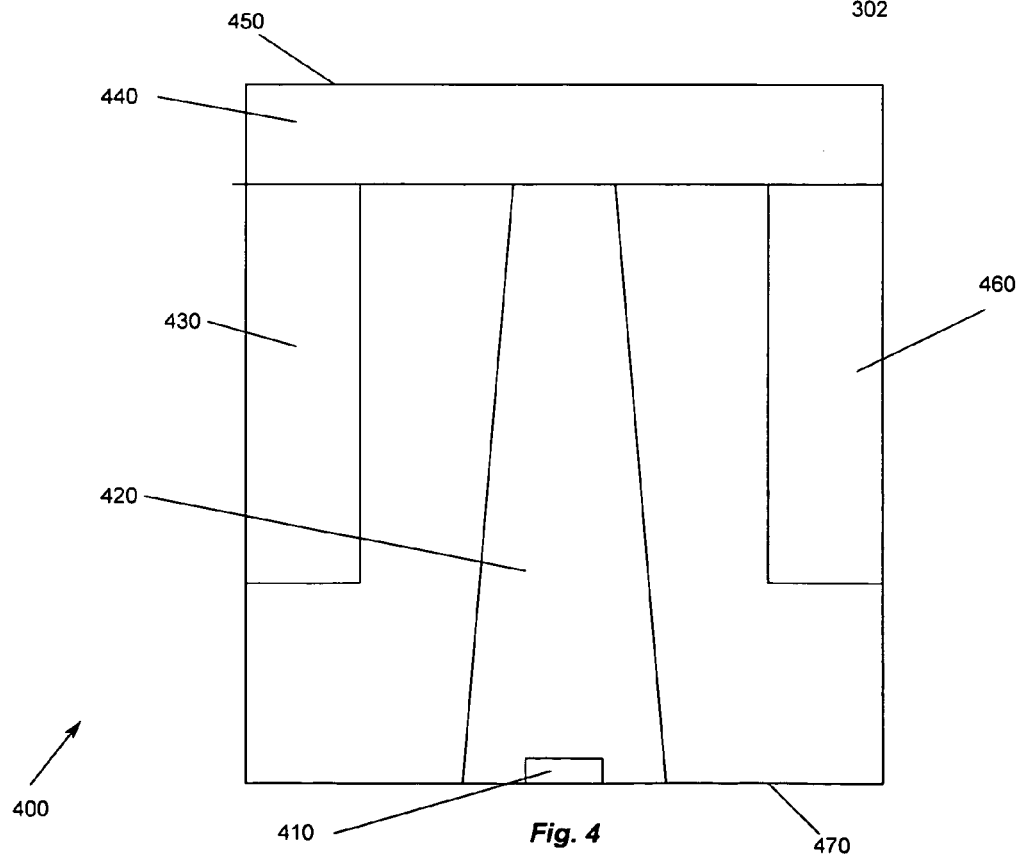
FIG. 4 illustrates an ABS view of the slider and the magnetic head according to an embodiment of the present invention.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

FIG. 5 is a side cross-sectional elevation view of a magnetic head 540. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current Is conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

FIG. 7 illustrates a view of the connect leads 520, 522 coupled to the coil 584 for the write pole piece 594. As shown in FIGS. 4-7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

As mentioned, the top critical dimension (CD) of the pole for perpendicular head is the most critical head parameter. Any deterioration to the CD cannot be accepted. However, ion milling laminated magnetic film through a hard mask creates fencing on the sidewall of remaining hard mask. Conventional stripping processes like wet stripping or snow cleaning all have their disadvantages in removing the remaining hard mask, e.g., wet stripping has difficulty to completely remove the fencing and snow clean could easily bend the pole. Thus, a method for forming a write pole of a magnetic write head that overcomes these problems is provided by embodiments of the present invention.

The present invention includes at least two embodiments for forming a write pole of a magnetic write head. A method for forming a write pole of a magnetic write head according to an embodiment of the present invention approaches the problem from the opposite direction of a typical fence lift-off concept by enforcing the fence instead of removing the fencing. This is achieved by depositing protecting layer(s) or fencing supporting layer before the remaining fencing-supporting hard mask is stripped. By reinforcing the fencing, the remaining hard mask can be safely stripped off without weakening the fencing, which can stand steadily during subsequent alumina refill. The critical pole will also be protected by the deposited protective film. Further, no corner rounding will occur.

In a first embodiment of the present invention, inorganic materials like $Al_2O_3$, $TaO_2$, $SiO_2$, etc. is used for the protective layers to support the fencing: In a second embodiment of the present invention, nonmagnetic metal, such as NiCr, Tungsten, etc., is used for the protective layers to support the fencing: A third embodiment of the present invention may utilize both.

Figure 8:
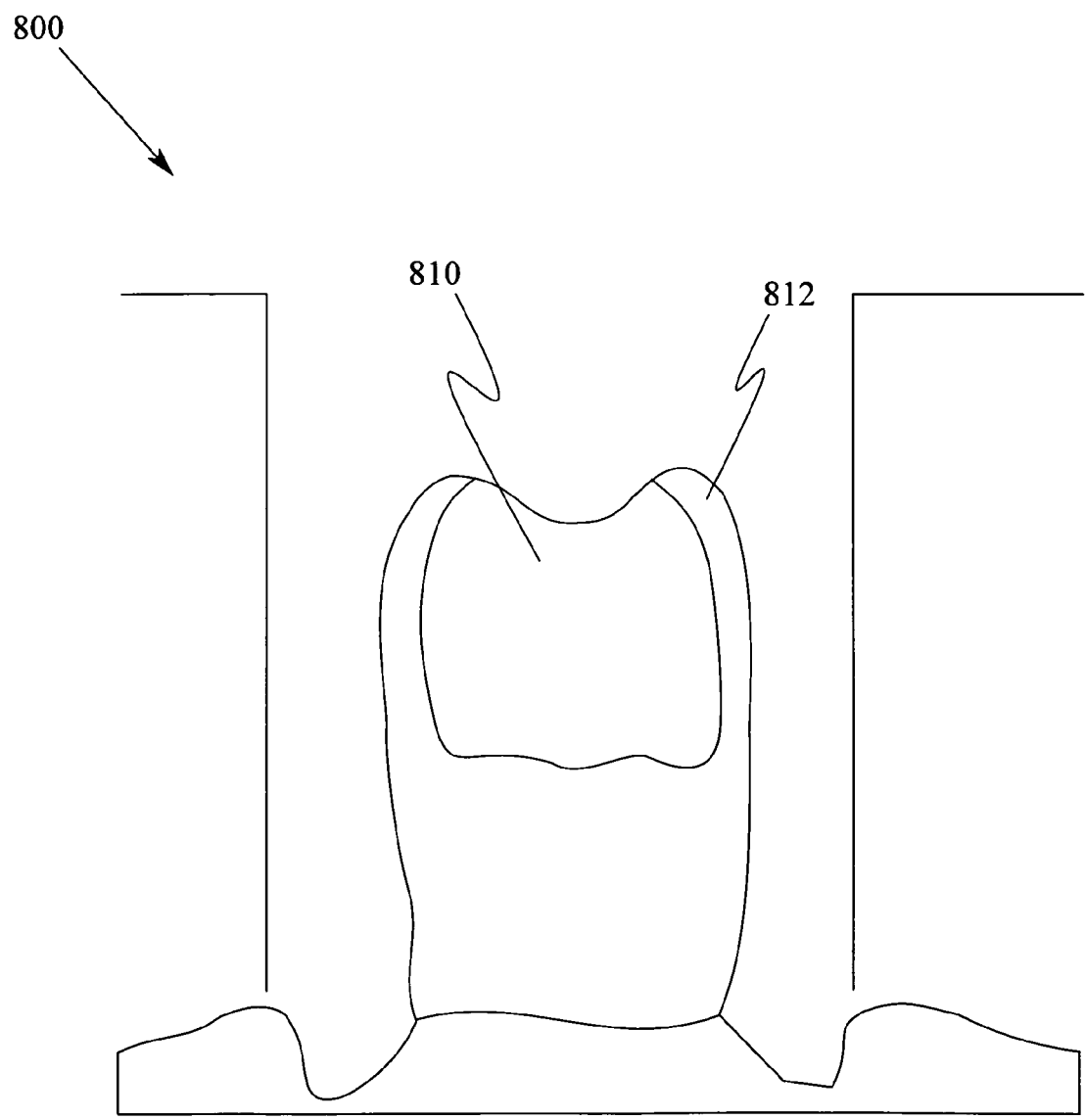
FIG. 8 shows the perpendicular pole after being defined by ion milling according to an embodiment of the present invention.

FIGS. 8-12 illustrate the method for forming a write pole using inorganic layer as the supporting layer for the fencing according to an embodiment of the present invention. In FIG. 8, the perpendicular pole 800 is shown after being defined by ion milling according to an embodiment of the present invention. After perpendicular pole is defined by ion milling, a portion of hard mask 810 is left on top of pole. Sidewall fencing 812 surrounds the hard mask 810.

Figure 9:
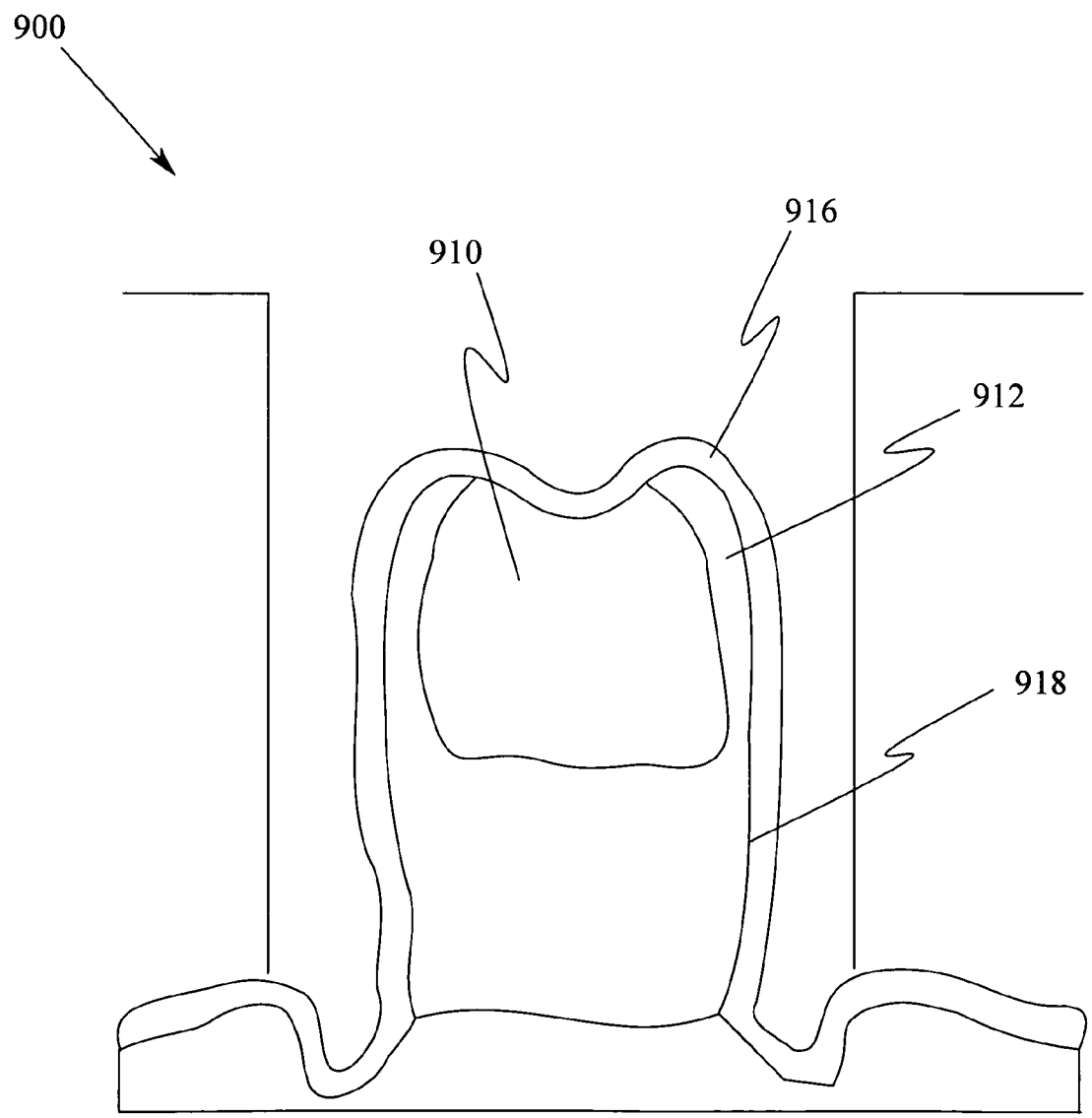
FIG. 9 shows the top pole after a thin inorganic film is deposited over the ion milled top pole according to an embodiment of the present invention.

FIG. 9 shows the top pole 900 after a thin inorganic film 916 is deposited over the ion milled top pole according to an embodiment of the present invention. The thin inorganic film 916 may comprises $Al_2O_3$, $TaO_2$, $SiO_2$, etc. Preferably the thin film 916, e.g., $Al_2O_3$, is used because of its excellent milling resistance, which allows it to be deposited on the remaining hard mask 910 and also on the defined pole fencing 912 and sidewall 918.

Figure 10:
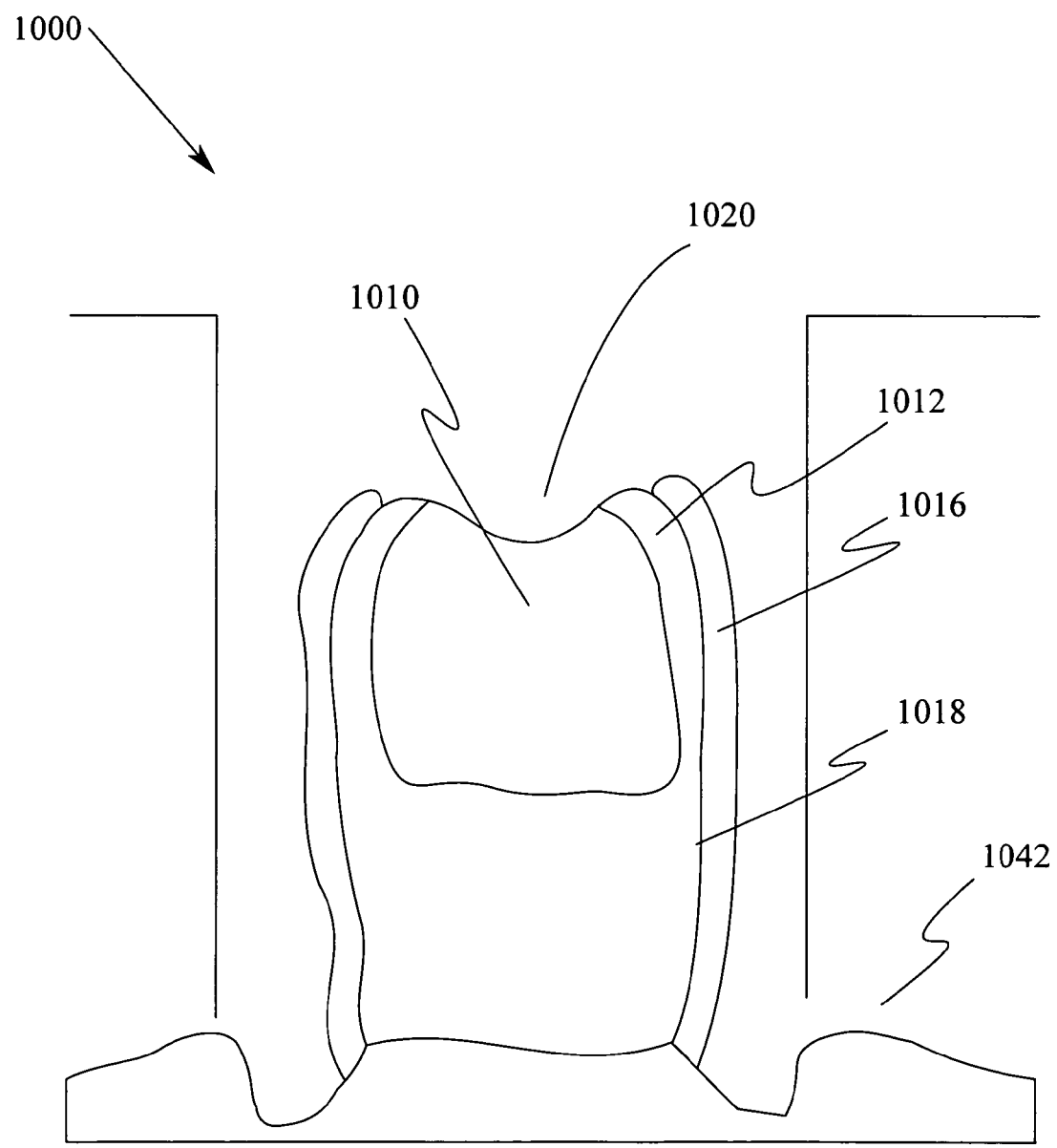
FIG. 10 shows the top pole after removal of a portion of the thin inorganic film according to an embodiment of the present invention.

FIG. 10 shows the top pole 1000 after removal of a portion of the thin inorganic film according to an embodiment of the present invention. Reactive ion etching or milling may be applied to remove only the portion of the thin film 1016 on top of the hard mask 1010 and field area 1042 leaving opening 1020. However, this process will leave the thin film 1016 intact on the sidewall 1018 and the fencing 1012 of the pole. Direction-controlled RIE or reactive ion mill can be further applied to mainly consume a top portion of the hard mask 1010 together with its sidewall fencing 1012 so that the height of the remaining hard mask 1010 and the fencing 1012 can be significantly reduced without damaging the critical pole dimension thanks to the protective thin film layer 1016. Thus process provides a trench structure aspect ratio (after hard mask 1010 is stripped) that is less than 1:1 so that there will be no issue for subsequent alumina refill.

Figure 11:
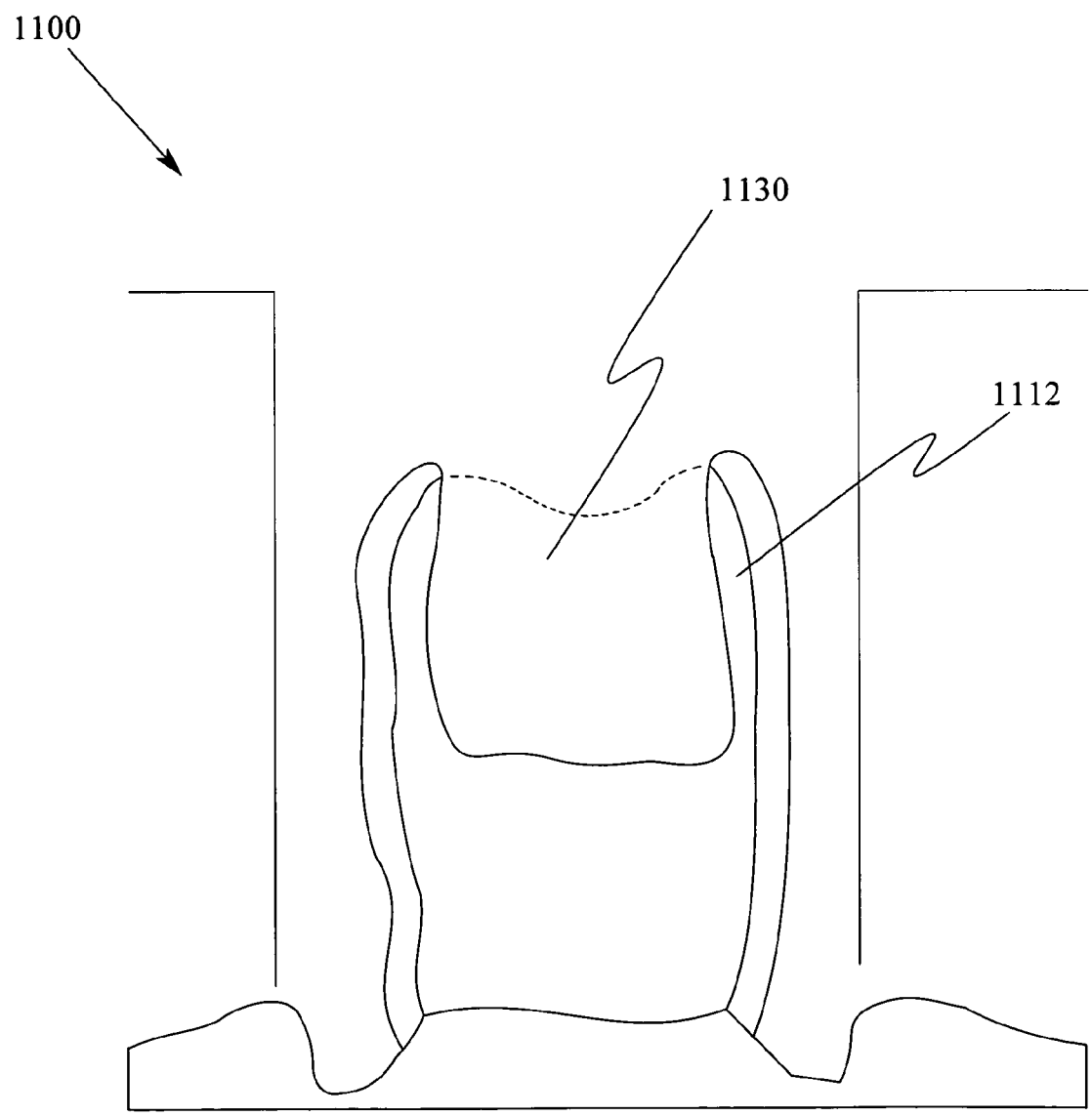
FIG. 11 shows the top pole after removal of the hard mask according to an embodiment of the present invention.

FIG. 11 shows the top pole 1100 after removal of the hard mask according to an embodiment of the present invention. The remaining hard mask may be removed by a wet or dry stripping process leaving void 1130. As can be seen in FIG. 11, the fencing 1112 now has been enforced by the deposited thin film 1116 and will not collapse.

Figure 12:
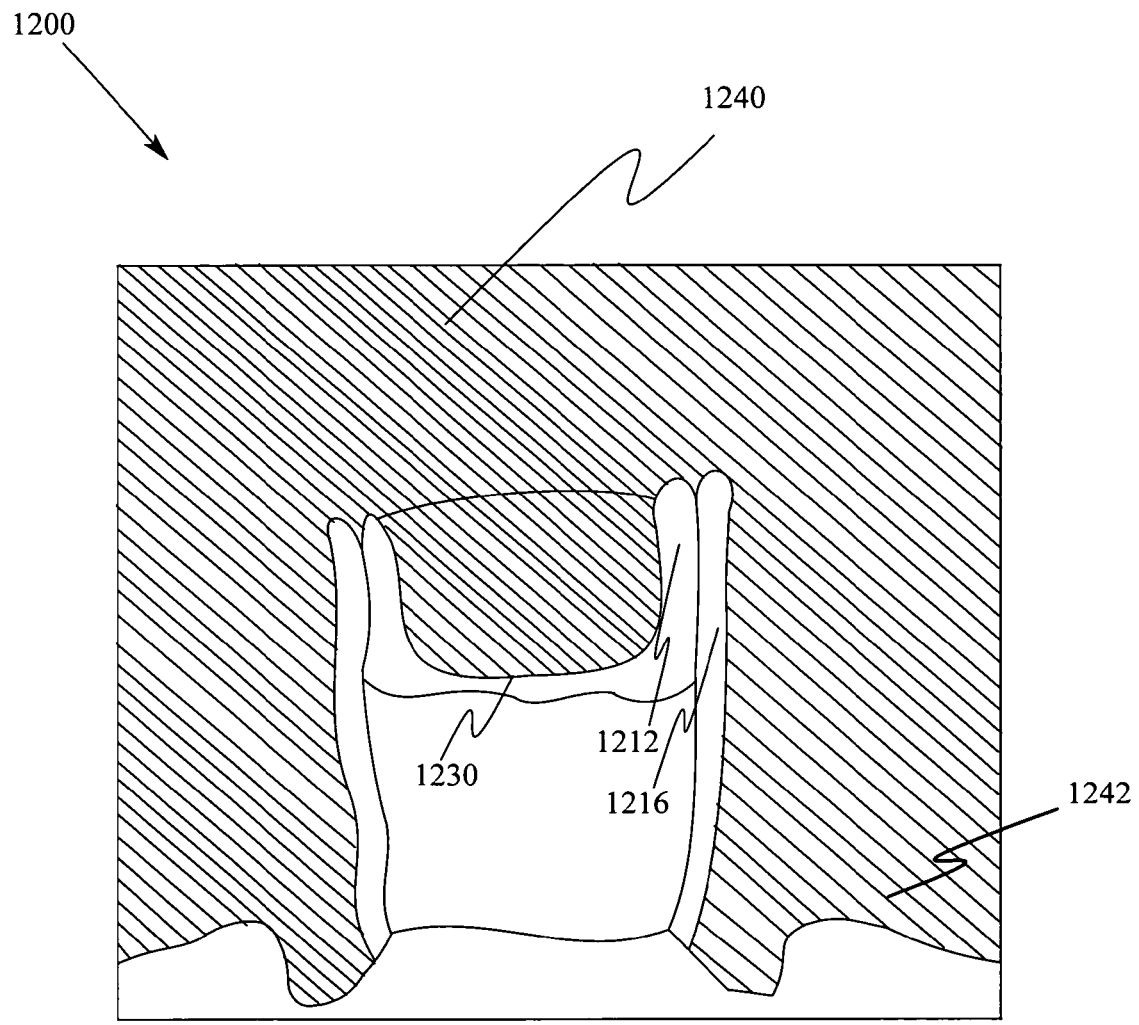
FIG. 12 shows the top pole after an alumina fill has been applied to the trench according to an embodiment of the present invention.

FIG. 12 shows the top pole 1200 after an alumina fill 1240 has been applied to the trench according to an embodiment of the present invention. As shown in FIG. 12, the alumina fill is applied to fill the shallow trench 1230 and field 1242 area. The perpendicular pole fencing 1212 is defined without any corner rounding. The thin fencing 1212 is supported by the deposited thin film layer 1216 and thus will not collapse to cause any fill defect.

Figure 13:
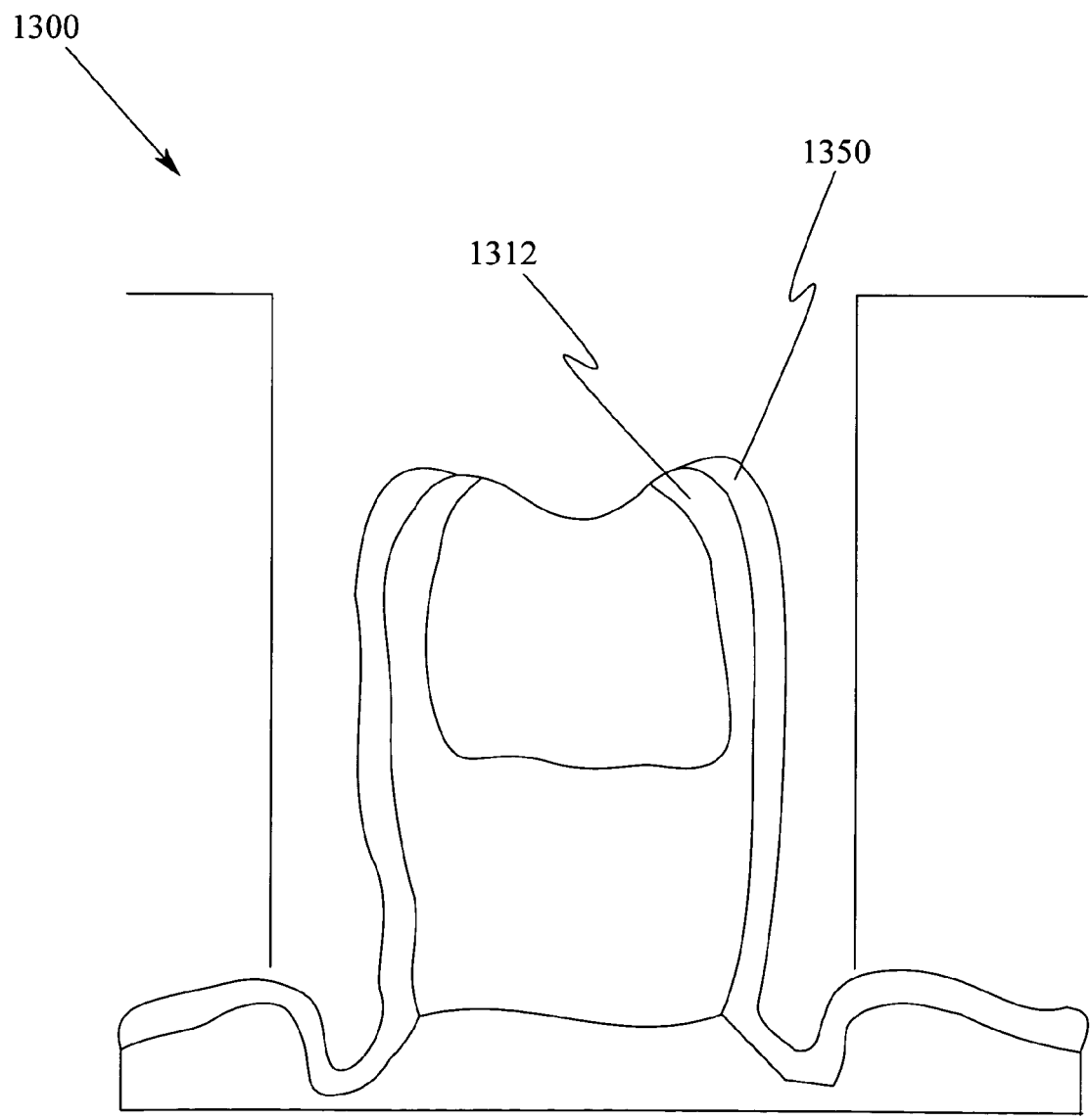
FIG. 13 illustrates the method for forming a write pole using a nonmagnetic metal layer as the supporting layer for the fencing according to an embodiment of the present invention.

FIG. 13 illustrate the method 1300 for forming a write pole using a nonmagnetic metal layer as the supporting layer for the fencing according to an embodiment of the present invention. FIG. 13 shows the nonmagnetic metal layer 1350 after removal of only the top portion of the metal layer 1350 (similar to FIG. 10 except a nonmagnetic metal layer remains). The pole fencing 1312 and remaining hard mask sidewall metal layer 1350 are left intact. The protective layer 1350 may be formed using a nonmagnetic metal layer such as NiCr, Rh, Tungsten, etc. Rather than using reactive ion etching or reactive ion milling to remove only the top portion of the metal layer 1350, a sputter etch process or low angle ion milling is used.

Figure 14:
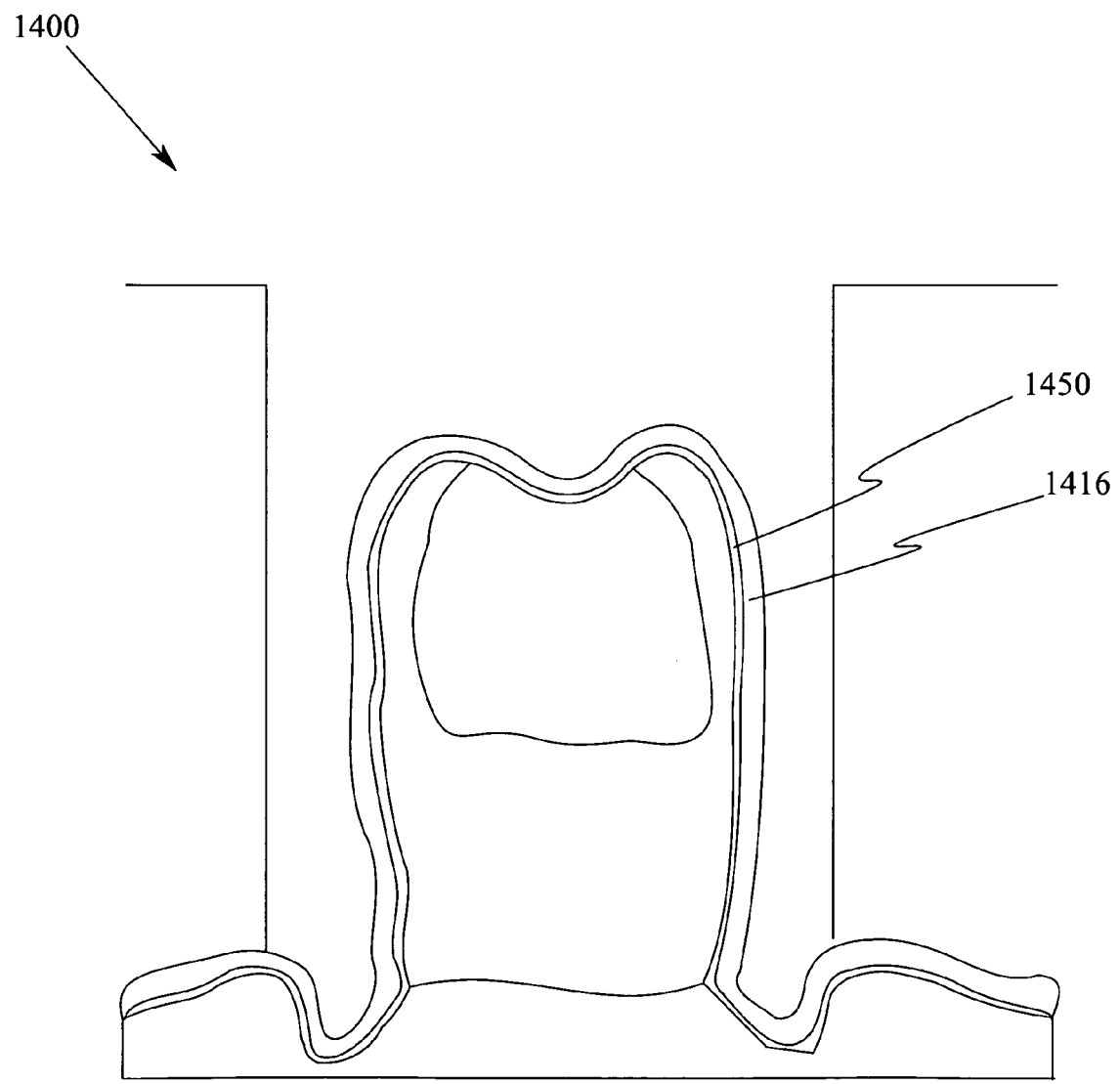
FIG. 14 shows the top pole after both a thin inorganic layer and a nonmagnetic metal layer are deposited over the ion milled top pole according to an embodiment of the present invention.
Figure 15:
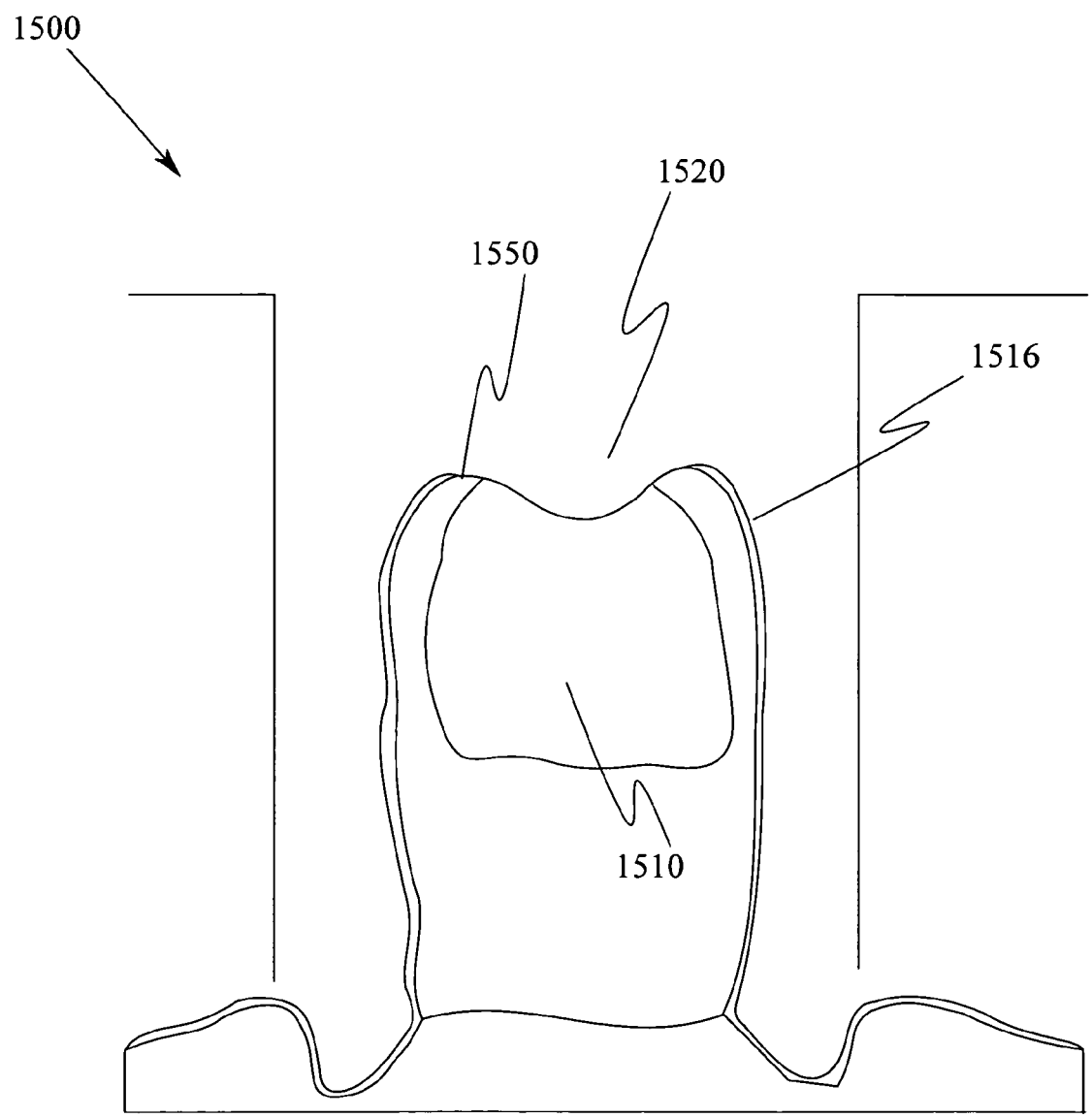
FIG. 15 shows the top pole after removal of the thin inorganic layer and a nonmagnetic metal layer from the top of the pole according to an embodiment of the present invention.

FIGS. 14-15 illustrate the method for forming a write pole using both inorganic and nonmagnetic metal layers as the supporting layer for the fencing according to an embodiment of the present invention. FIG. 14 shows the top pole 1400 after both a thin inorganic layer 1416 and a nonmagnetic metal layer 1450 are deposited over the ion milled top pole according to an embodiment of the present invention. As shown in FIG. 14, rather than depositing only a thin inorganic film 1416 over the ion milled top pole as shown in FIG. 10, a thin metal film 1450 is also deposited followed by the deposit of the thin inorganic film 1416.

FIG. 15 shows the top pole 1500 after removal of the thin inorganic layer and a nonmagnetic metal layer from the top of the pole according to an embodiment of the present invention. Reactive ion etching or reactive ion milling may be applied first to remove deposited inorganic material 1516 on top of remaining hard mask 1512. The thin metal film 1550 serves as a reactive ion etching or reactive ion milling stop layer to ensure the pole corner is not damaged by the reactive ion etching or reactive ion milling process. Then a low angle sputter etch or ion milling may be applied to further open the deposited thin metal film 1550 on top of the remaining hard mask 1510 thereby leaving opening 1520.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A write head, comprising a write pole, the write pole including a first and second fencing extending from the write pole to form a recessed area between the first and second fencing, the fencing and a sidewall of the write pole having a layer of support material formed on an outer surface to provide support to the sidewall of the write pole and the fencing, wherein a fill material is deposited in the recessed area between the first and second fencing and around the fencing and support material, the fencing and the support material extending to an opening of the recessed area.

2. The write head of claim 1, wherein the fill material comprises alumina.

3. The write head of claim 1, wherein the support material deposited along the outer surface of the sidewall and fencing comprises an inorganic material.

4. The write head of claim 1, wherein the support material deposited along the outer surface of the sidewall and fencing comprises a non-magnetic metal material.

5. The write head of claim 1, wherein the layer of support material deposited on the outer surface of the sidewall and fencing further comprises a thin layer of non-magnetic metal material and an inorganic material disposed over the thin layer of non-magnetic metal material.

* * * * *